Feb. 1, 1955
P. J. DASHER
2,701,268
METHODS FOR RECLAIMING UNVULCANIZED RUBBER
SCRAP, OR THE LIKE, CONTAINING FIBER BY
TREATMENT WITH MINERAL ACID VAPOR
Filed March 14, 1951
3 Sheets-Sheet 3
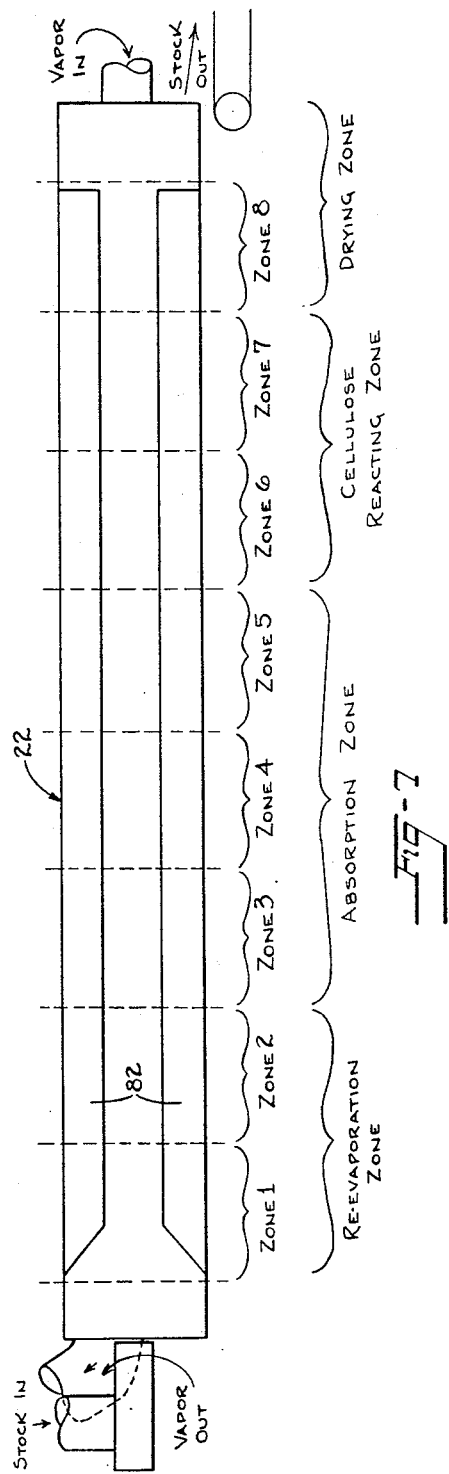
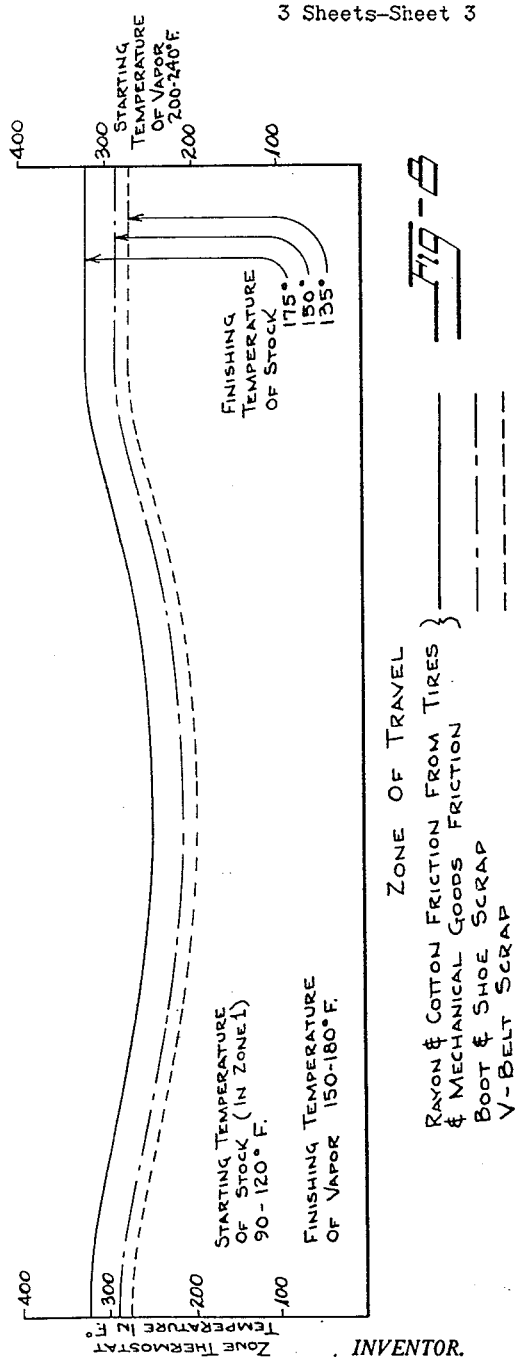
INVENTOR.
Paul J. Dasher
BY
Oldham & Oldham
ATTYS.

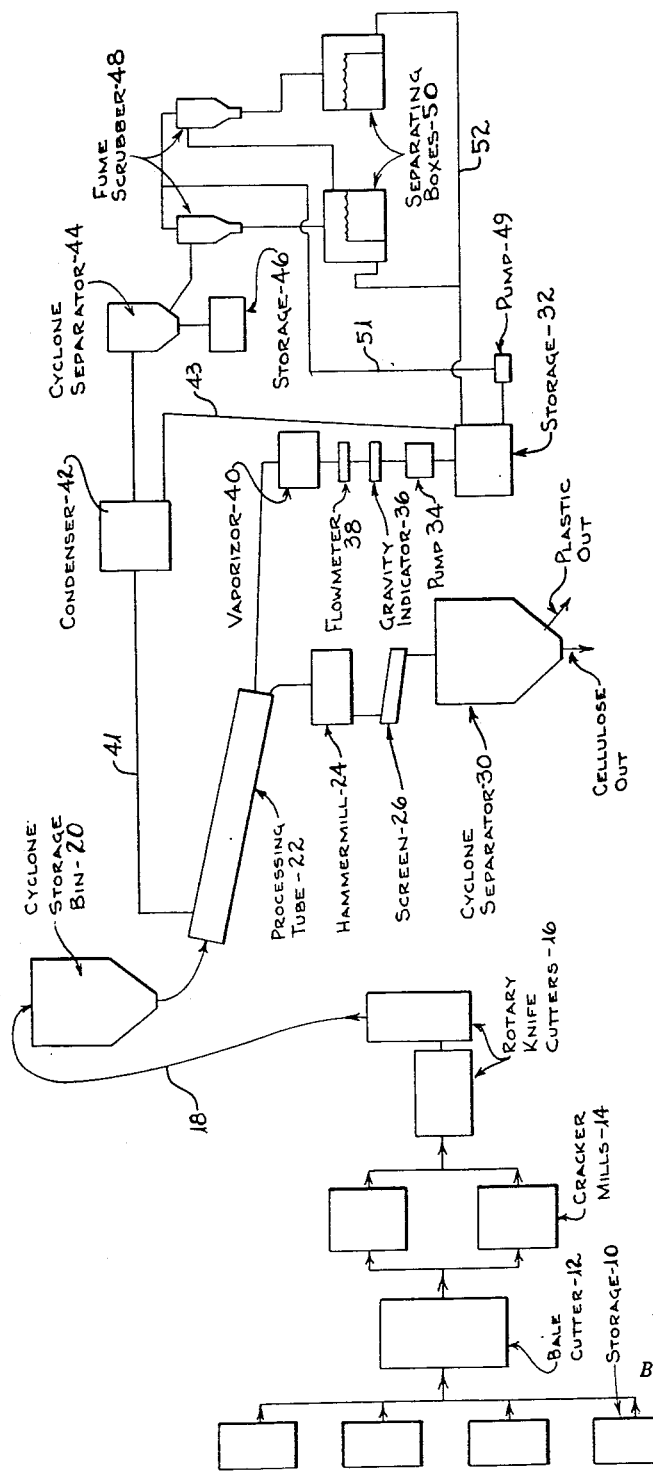

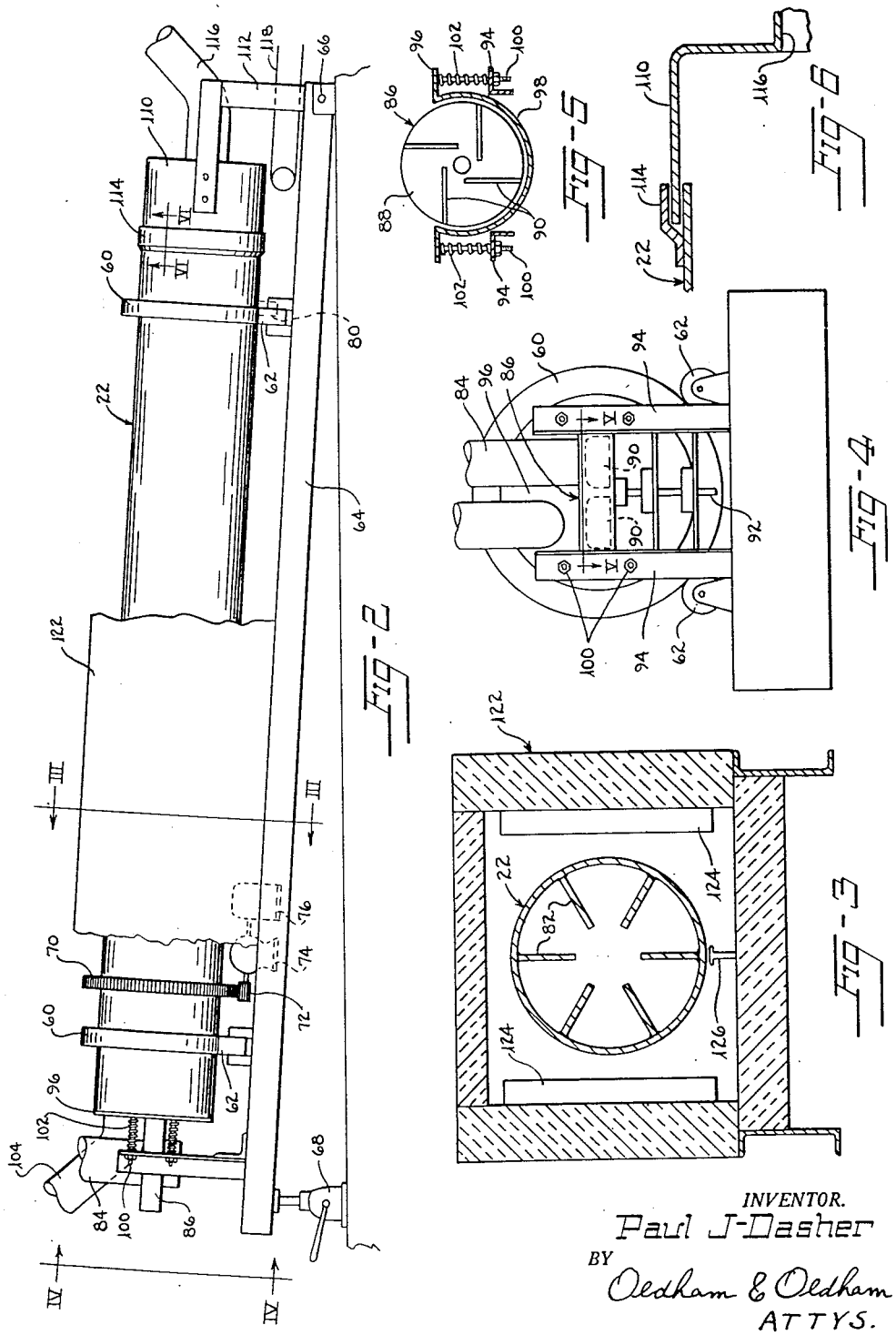

United States Patent Office 2,701,268
Patented Feb. 1, 1955

2,701,268

METHODS FOR RECLAIMING UNVULCANIZED RUBBER SCRAP, OR THE LIKE, CONTAINING FIBER BY TREATMENT WITH MINERAL ACID VAPOR

Paul J. Dasher, Willoughby, Ohio, assignor to Dasher Rubber and Chemical Company, Fairport Harbor, Ohio, a corporation of Ohio Application March 14, 1951, Serial No. 215,495

7 Claims. (Cl. 260—711)

This invention relates to methods and apparatus for reclaiming fiber-containing rubber scrap, or the like, and, more particularly, is concerned with methods and apparatus for removing from plastic material such as rubber, rayon, cotton, or like fibers.

It has been proposed many times heretofore to employ acid or acid vapor for removing cotton or other fibers from plastic, such as unvulcanized rubber. However, so far as I am aware, none of these known methods have met with widespread or continued commercial success, and none of these methods are employed today in the rubber industry, for example, in order to salvage or reclaim rubber from scrap including vegetable and like fibers. The lack of use of known acid-treating techniques in the rubber industry exists in spite of the fact that many, many tons of vegetable fiber-containing, unvulcanized rubber scrap results every day in the manufacture of various friction-containing rubber products, such as tires, mechanical goods, V-belts, and boots and shoes.

It is my opinion that the rubber industry, which, from time to time, has tried to render commercially practical acid vapor treating techniques for removing vegetable fibers, has finally discarded all known methods as impractical and unsatisfactory because of expense of treatment, difficulty of maintaining treatment conditions uniform, lack of completeness of treatment, that is, lack of removal of all vegetable fibers, expense of maintenance of equipment, and lack of maintenance of proper operating conditions, and specifically temperatures, during treatment.

Of course, the rubber industry does employ successfully rubber reclaiming processes of the alkali type on vulcanized rubber which reconditions the vulcanized rubber to a semi-unvulcanized state, for example, so that it can be mixed with unvulcanized rubber, compounded, and subsequently vulcanized. These known reclaiming operations on vulcanized rubber are often performed upon rubber containing vegetable fibers, with the fibers being converted to ash, which is usually washed out of the reclaimed rubber. These successful alkali processes for reclaiming vulcanized rubber should not be confused with the acid vapor methods of the present invention and those discussed above of the prior art for reclaiming unvulcanized rubber scrap, and, particularly, the removal of vegetable fibers therefrom.

It is the general object of my invention to avoid and overcome the foregoing and other difficulties of and objections to known methods and apparatus for reclaiming unvulcanized rubber containing fabric by the provision of improved inexpensive, readily handled apparatus and methods for commercially and in production quantities reclaiming unvulcanized rubber, and the like, and for removing vegetable fibers, such as rayon and cotton.

Another object of my invention is to provide substantially automatic apparatus of relatively inexpensive character for rapidly and continuously, and with a minimum of supervision, removing vegetable fiber from unvulcanized rubber.

Another object of my invention is the provision of simplified and improved methods for removing vegetable fiber from unvulcanized rubber, or the like, and wherein the treating method is continuous and with the rubber scrap being at all times during the treating process at a temperature definitely below a temperature which would injure it.

Another object of my invention is the provision of an improved method and apparatus for recovering acid after the scrap treating process.

Another object of my invention is to provide methods for treating rubber scrap, and the like, in which the acid vapor employed in the treating process is derived from a water solution of the acid gas in a concentration such that when the acid vapor engages the scrap, it will have a dehydrating effect on the scrap and with the resulting acid gas and water vapor in contact with the scrap being substantially constant boiling in character, i. e., in the neighborhood of 20.2% acid gas present.

Another object of my invention is the provision of a treating process of the character described wherein the temperature of the scrap and of the acid vapor is carefully controlled along a treating path to create a series of separate zones which blend one into the other, and with the temperature of the stock at all times being kept below the temperature of the acid vapor.

Another object of my invention is to provide a treating process of the general type referred to above in which the heat at the end of the treating path where the vapor first engages the scrap is relatively high to create a drying zone, the heat then gradually dropping off as the vapor moves along the path to create a fabric-reacting zone and an absorption zone, and then the heat building back up during the last portion of the travel of the gas over the scrap to substantially the temperature of the drying zone to create a re-evaporation zone.

Another object of my invention is to provide apparatus for the processes and methods described and wherein adjustments can be readily made to control factors of time of reaction, temperature, and concentration whereby quality production reclaiming is consistently achieved.

The foregoing objects of my invention, and other objects which will become apparent as the description proceeds, are achieved by passing the broken-up scrap along an elongated path while agitating the scrap, passing a mineral-acid vapor usually in the opposite direction over the scrap during its travel along the path, maintaining the vapor at a temperature higher than the temperature of the scrap during the passage of the scrap along the path, and applying controlled heat around the path of travel of the vapor and scrap. Usually the heat applied is higher at both ends of the path than in the middle thereof. Also, the finishing temperature of the scrap is never above about 175° F. Preferably a mineral acid is employed, and specifically hydrochloric acid, and I employ a concentration of between about 21% to about 28% HCl gas so that when the acid vapor engages the scrap, the amount of water present in the scrap will join with the acid vapor to result in an acid vapor having substantially a constant boiling point, i. e., a concentration of substantially 20.2% HCl in the water which, in liquid form, boils at a constant boiling point of 110° C.

In the apparatus of the invention, I employ an acid-resistant tube which is journalled for rotation about its own axis, usually at a selectively variable speed, and with the tube being preferably adjustably supported at a selected angle with the horizontal. Vapor supply means are connected to the lower end of the tube, and the acid vapor is drawn out the upper end of the tube with jet-scrubbing means, or the like, for applying a sucking action to the tube. Scrap supply means are connected to the upper end of the tube and may include centrifugal feed means. The tube carries vanes for agitating the scrap as it moves down the tube, and the entire tube is surrounded by an insulating hood. A plurality of independently controllable heating elements are positioned between the hood and tube for establishing a plurality of heat zones along the length of the tube. Acid recovery means are provided for salvaging as much of the treating acid as possible.

For a better understanding of my invention, reference should be had to the accompanying drawings, wherein:

Fig. 1 is a schematic layout of one typical embodiment of the apparatus of my invention in its entirety and capable of performing the improved method of my invention;

Fig. 2 is a side elevation, partially broken away, of the processing tube forming a part of my invention;

Fig. 3 is a vertical transverse cross-sectional view of the processing tube of Fig. 2, and taken substantially on line III—III of Fig. 2, and on a slightly larger scale;

Fig. 4 is an end view of the processing tube, taken substantially on line IV—IV of Fig. 2, and on a slightly larger scale;

Fig. 5 is a fragmentary sectional view taken on line V—V of Fig. 2 and illustrating details of the centrifugal feed means for the scrap;

Fig. 6 is an enlarged fragmentary sectional view taken substantially on line VI—VI of Fig. 2 and showing a labyrinth seal at one end of the processing tube;

Fig. 7 is a diagrammatic illustration of the processing tube of Fig. 2, and illustrating the controlled heat zones thereof; and Fig. 8 is a graphical representation of the treating temperatures in the various zones of Fig. 7, and likewise, Fig. 8 supplies additional information as to the temperatures of the acid vapor and the scrap.

The principles of my invention are broadly applicable to the removal of cellulose from plastic in any of a variety of forms, but are specifically adapted to the removal of vegetable fiber from unvulcanized rubber scrap. For purposes of simplification, the invention will be described in conjunction with operations upon rubber, but the scope of the invention is not to be so limited unless specifically stated.

In the drawings, and having particular reference to Fig. 1, the numeral 10 indicates a plurality of storage compartments or bins for receiving rubber scrap or other similar materials to be reclaimed, and from the storage bins the rubber travels by conveyor, truck, or the like, to a bale-cutter 12 which cuts the scrap into blocks of a size which can be conveniently handled. The blocks of scrap travel by suitable conveyor or hand truck to one or more cracker mills 14 of known type and character which break up the blocks of scrap into rough, coarse sheets, which in turn are conveyed or otherwise carried to rotary knife cutters 16.

The rotary knife cutters 16 are preferably employed in pairs, two cutters being positioned at right angles to each other in the manner shown in Fig. 1 so that a rough sheet of scrap fed into the first cutter results in the sheet being cut into a plurality of narrow strips which then pass to the second cutter at 90° so that the strips are cut into small pieces. In fact, the scrap should be broken up by the process described so that all particles of the scrap will now pass through approximately a ⅜″ screen. This breaking up or comminuting of the scrap to relatively small particle size insures that the vegetable fibers or fabric embedded in the scrap are exposed at least at their ends on one or more surfaces of the scrap with no piece of the scrap or of the vegetable fibers being very long whereby the vegetable fibers are adequately exposed to attack by the acid vapors, as hereinafter described.

From the rotary knife cutters 16, the broken-up scrap is passed, usually by an air conveyor 18, to a storage bin 20. Preferably this storage bin 20 is of the cyclone or blower type so that, should any light pieces of the fabric have been mechanically removed from the rubber by the previously described treating process, these portions of fabric will be separated and removed from the rubber scrap by the cyclone storage bin.

The rubber scrap is fed from the storage bin 20, often by gravity and with the aid of a centrifugal feeding means to be hereinafter described, to a processing tube, indicated as a whole by the numeral 22. This processing tube will be described in detail hereinafter together with the method performed therein. Suffice it to say here that the rubber scrap moves through the processing tube 22 to a hammer mill 24 which serves to break up and mechanically separate the rubber scrap from the fabric which has been attacked by the acid vapors in the processing tube 22. From the hammer mill 24, the rubber scrap passes to a screen 26 which is vibrated to separate out and discard objectionably large particles of scrap. The material then passes to the cyclone-separator 30, of known construction, which centrifugally and with the aid of air separates the refined scrap from the hydrolized fabric or fiber, separate conduits receiving the refined scrap and the hydrolized fiber. The fiber is salvaged as well as the scrap and can be used as a filler for rubber or plastic or as cellulose having a long chain length.

It will be understood that acid vapor is passed through the processing tube 22, preferably in a direction opposite to the flow of scrap therethrough, and the acid vapor is obtained from acid carried in a storage tank 32 from which it is lifted by a pump 34, passed through suitable indicating means, such as a gravity indicator 36 and a flow meter 38, to a vaporizer or boiler 40, from which the acid vapor is conducted by a suitable acid-resisting pipe to the tube 22.

From the processing tube 22, the acid vapor is withdrawn usually by suction and by a conduit 41 of acid-resistant type to a condenser 42 which condenses a large proportion of the acid and water vapor back to liquid acid which flows back to the storage tank 32 by way of conduit 43. Any uncondensed vapor passes to a cyclone separator 44 which removes any fabric that might be pulled into the separator, such material passing to a storage tank 46. Fume scrubbers 48 of the jet type draw the remaining acid vapor from the separator 44 into separating boxes 50 and simultaneously condense the vapor, the condensed liquid flowing by conduit 52 back to the acid storage tank 32. The fume scrubbers 48 and separating boxes 50 are connected in series in the manner illustrated to insure that no acid vapor fumes escape into the atmosphere. Conduit 42 and separate 44 may be insulated to help avoid condensation except at the condenser 42. An unusual feature of the action of the fume scrubbers 48 is that these are driven in their jet action by liquid acid taken from the storage tank 32 by pump 49 and conduit 51. Also, it might be noted here that instead of drawing the acid vapor with a suction action through the processing tube 22, I may use a forced draft with a blower fan or fans.

Referring now to Figures 7 and 8 of the drawings, and particularly considering the improved reclaiming method of my invention, Fig. 7 diagrammatically illustrates the travel of the scrap along an elongated path provided by the processing tube 22, and with the acid vapor preferably moving through the tube in a direction opposite to the travel of the stock. I have divided my processing tube into a series of eight zones and independently and individually control the temperature of each one of the eight zones so as to obtain an exact control of temperature during the treating process. Zones 1 and 2 comprise a re-evaporation zone; zones 3, 4, and 5 constitute an absorption zone; zones 6 and 7 comprise a cellulose-reacting zone; and zone 8, a drying zone.

Now looking at the graph of Fig. 8, the zone of travel is shown as the abscissa, the ordinate is shown in terms of zone thermostat temperature in degrees Fahrenheit. The resulting curves are, respectively, a solid line showing the zone temperatures for the treatment of tires and mechanical goods scrap, the chain-dotted line for boot and shoe scrap, and the dotted line for V-belt scrap. It will be noted that the solid line curve in Fig. 8 shows a temperature in zone 1 of approximately 325° F., this gradually dropping down to a temperature of about 250° F. in zones 4 and 5, and building back up to a temperature in zones 7 and 8 of somewhat over 300° F. and usually in the neighborhood of 325° F. Boot and shoe scrap treatment involves zone temperatures which are down some 30° F. or so from the zone temperatures used for treating tires and mechanical goods scrap, for example, a temperature in zone 1 of about 290° F. gradually decreasing to zones 4 and 5 to a temperature of about 210° F. and building back up to a temperature of about 290° F. in zones 7 and 8, all as indicated by the chain-dotted line. The dotted line representing the zone temperatures for the treatment of V-belt scrap, unusually high in rubber, is some 10° F. to 15° F. lower than the zone temperatures for the treating of boot and shoe scrap, and involves, for example, about a 275° F. temperature in zone 1 gradually reducing to a temperature of about 200° F. in zones 4 and 5, and building back up to about a 275° F. temperature in zones 7 and 8.

Fig. 8 is also of interest in illustrating that the starting temperature of the scrap in zone 1 is from about 90° F. to about 120° F., and during the passage of the scrap through the processing tube, the temperature of the stock gradually climbs until the finishing temperature of the stock is as shown, namely, about 175° F. maximum for scrap from tires and mechanical goods, about 150° F. maximum for boot and shoe scrap, and about 135° F. maximum for V-belt scrap. Fig. 8 also illustrates that the starting temperature of the acid vapor is between about 200° F. and about 240° F., and the finishing temperature of the vapor is between about 150° F. and about 180° F.

Several important characteristics of my improved process reveal themselves from a study of Figures 7 and 8. In the first place, it becomes evident that in my process the scrap being treated is always at a temperature less than the temperature of the acid vapor employed to treat the scrap. This is important for the reason that the acid vapor tends to condense on the stock, and allows the stock to be treated at a minimum temperature to thereby avoid burning or vulcanization of the rubber of the scrap while insuring the maximum of chemical action upon the cellulose fibers of the scrap. It should be noted here that the action of the acid vapor upon the fibers is one of hydrolysis in which two chemical reactions compete. The first of these reactions is merely the de-polymerization (shortening of chain length) of the cellulose molecule. The second reaction is the actual hydrolysis of the cellulose molecule to sugar, which is objectionable from a reclaim standpoint. By keeping the temperature on the cellulose low as above described, I am able to confine the treatment of the cellulose largely to the first reaction described, without the second reaction ever getting a chance to get really started.

A particularly important part of the action described in the preceding paragraph is effected by the use of a mineral acid, and specifically hydrochloric acid of a concentration between about 21% and about 28%. It is known, of course, that hydrochloric acid of a HCl concentration of 20.2% is constant boiling in character, boiling about 110° C., and the acid vapor contains substantially the same percentage of HCl as the liquid acid. When hydrochloric acid is concentrated up to contain the limit of about 39% HCl, the boiling point is lowered and the acid vapor is largely HCl. At least certain of the advantages of my invention can be achieved by using HCl gas alone, as, for example, in the treatment of very wet scrap within the limits of the results to be achieved as discussed in the following paragraph.

I have discovered that using an acid concentration of between about 21% and about 28% HCl, and usually in the neighborhood of about 25% HCl, I obtain a very definite drying and dehydrating action upon the rubber scrap being treated. Ordinarily there is a considerable amount of water present in the scrap, for example, on an average about 8 pounds of water in 100 pounds of scrap, and when I employ an acid having a concentration within the limits specified, then the acid vapor ends up on the scrap at a substantially constant boiling point concentration. In other words, the acid vapor absorbs the water present in the scrap, and this additional water in the acid vapor brings the HCl concentration to approximately the 20.2% HCl, namely, that of a constant boiling point mixture. Thus, the processing tube acts as a drying tube, and allows the scrap to be run at a lower temperature than with other known processes. It will be understood that in treating scrap having a high water content, for example, more than 8 pounds of water to 100 pounds of scrap, then I use an acid having a concentration up towards 28% HCl, and in treating a scrap having a low water content, I use an acid having a concentration of down towards 21% HCl.

I have likewise discovered that it is sometimes advantageous, for example, when working with difficult scrap, to employ a wetting agent on the scrap prior to treatment with the acid vapor. I have found wetting agents satisfactory which are selected from the polar groups, such as amines and sulfonates which are active in highly concentrated acid solutions and which are stable for at least one minute at a temperature not to exceed 225° F. I employ a wetting agent of the type indicated and in an amount of about .05 of 1% of the weight of the scrap and spray the wetting agent on the scrap in the cracker mill or at some point before the scrap passes to the treating tube. The wetting agent improves the condensing action of the acid vapor on the scrap and the acid action in penetrating up the cords of the fabric in the scrap is enhanced.

Another important criterion in my improved reclaiming process is the ratio of the total volume of acid gas to the total volume of scrap. Stated more specifically, to one volume of scrap, which runs about 20 pounds per cubic foot bulk density, I use at least about 8 volumes of acid gas. From a practical standpoint, I may use up to about 20 volumes of acid gas, and greater amounts than this usually merely serve to provide an excess of gas which, except for increasing the drying effect on the scrap, serves no useful purpose. Still more specifically, in a typical day's run, I employed 113 gallons of acid to treat about 24,000 pounds of stock. From a practical operative standpoint, the limits should be such that the acid gas volume used is sufficient to adequately perform the treating action on the fiber content of any given scrap being treated.

Having reference now to Figures 2 to 6 of the drawings, the numeral 22 indicates generally the processing tube to which are secured at spaced points along its length a plurality of bearing rings 60 which rotatably engage and are supported on cradle-forming rollers 62 carried on a base frame 64 which extends the full length of the tube and somewhat beyond the tube on each end. The base frame 64 is pivotally supported at one end, as at 66, and at the other end is adjustably supported by any suitable means, typical means being shown at 68, whereby one end of the frame can be vertically adjusted to control the inclination of the longitudinal axis of the tube 22 with the horizontal. Usually the angle of the tube 22 with the horizontal is between about 4° and about 8°, being generally in the neighborhood of 5° to 6°.

Means are provided for rotating the tube 22 about its longitudinal axis, and such means may comprise a ring gear 70 secured to the tube, this gear being engaged by a pinion gear 72 extending from a speed changer 74 driven by a motor 76. Of course, a variable speed motor may be utilized with or without gear reduction, and the rotation of the tube 22 can be adjusted to any one of a series of rotations per minute, for example, 14, 17, 28, or 55. A thrust bearing 80 is associated with at least one set of cradle rollers 62 to take up end thrust on the tube 22. Also, the tube 22, as best seen in Figures 3 and 7, is provided with a plurality of longitudinally extending vanes 82 for assisting in agitating and tumbling the scrap as it passes along the length of the tube during treatment.

The upper end of the tube 22, as viewed in Fig. 2, is adapted to receive the scrap which is supplied thereto by way of a conduit 84 which extends to a centrifugal feeding means 86. As seen in Fig. 5, these feeding means 86 include a disc 88 carrying a plurality of impeller blades 90, the scrap being usually gravity fed to the center of the impeller blades and being thrown out centrifugally as the disc 88 is driven from a shaft 92 by suitable motor means (not shown). The centrifugal feed mechanism 86 is carried on an end frame 94 secured to the base frame 64, and the centrifugal feed means 86 includes a round plate 96 having an opening cut therethrough to receive the disc 88 and impeller blades 90 of the centrifugal feed means, the casing 98 of the centrifugal feed means being welded or otherwise joined to the opening in the plate 96.

The plate 96 and the centrifugal feed means 86 are mounted for movement toward and from the end of the tube 22. This is accomplished by the provision of bolts 100 which are secured to the plate 96, and which extend through holes in the end frame 94. Compression springs 102 on the bolts hold the plate 96 in close proximity to the end of the tube 22 and the nuts on the bolts 100 are adjusted to insure that the clearance between the disc 96 and the end of the tube is kept at a minimum. A conduit 104 is connected to the plate 96 and provides for exhausting the acid vapor from the upper end of the tube 22.

At the lower end of the tube 22, I provide a short tubular portion 110 which is rigidly held by angles 112 on the base frame 64. A labyrinth seal, as best seen in Fig. 6, is provided between the tubular portion 110 and the end of the tube 22 by means of a flange 114 secured to the tube. A conduit 116 provides for the introduction of acid vapor into the tube 22, and the tubular portion 110 is provided with an opening near its bottom so that scrap moving down through the tube 22 is discharged out of the opening and is conveyed away from the processing tube 22, for example, by means of a conveyor belt 118.

It will be understood that the processing tube 22, and the various parts associated therewith and any conduits conducting the acid or acid vapor are made from acid-resistant material of any suitable type. I have found that Hastelloy B, an acid-resistant stainless steel alloy, is generally satisfactory.

Looking now at Figures 2 and 3, an important part of the processing tube 22 is the careful control of heat along the full length of the tube and in the various zones hereinbefore described. This I achieve by surrounding the tube 22 with a heat-insulating hood or cover 122, made of any suitable heat-resistant insulation, and constructed substantially in the form illustrated in Fig. 3 to surround the tops, sides, and bottom of the tube 22 over its entire length. The heat-insulating hood 122 is of a size so that heaters 124 can be positioned between the sides of the hood and the tube 22, an independently controlled heater being associated with each of the various zones particularly illustrated in Fig. 7 of the drawings. Preferably the heaters 124 are electrical in character, and are arranged to be individually controlled so as to provide the heat specified in Fig. 8. A thermostat 126 is provided in each zone, and as shown in Fig. 3, is conveniently positioned in close proximity to the outer periphery of the tube 22, and it is the temperature at this point which is referred to in the curves and temperature of Fig. 8.

In the operation of my improved process, it will be understood that three variables are of particular importance. These are the concentration of the acid vapor used in the treatment, the temperature maintained during the treatment, and the length of time of the treatment. I have already discussed the acid concentrations, and the temperature of treatment. Insofar as the length of time of the treatment is concerned, it will be recognized that increasing the angle of inclination of the processing tube 22, and the speed of rotation of the tube 22, will reduce the treatment time. With acid concentrations and treating temperatures as described, the speed of rotation of the tube and the angle of inclination to the horizontal are adjusted so that the total length of treating time of the scrap is between about two and about six minutes, and is usually in the neighborhood of four to five minutes.

It may be observed that, insofar as time of treatment is concerned, with larger size material, for example, material towards or above the ⅜" particle size, the material moves more quickly through the treating tube with the tube angle and R. P. M. the same. Thus, with treatment on larger particle size and because of the necessity for the gas vapor to penetrate further into the larger particles, the tube angle should be decreased, or the R. P. M. of the tube should be decreased, or the gas vapor volume should be increased. With smaller particles of material towards 1/16", for example, the converse of the above is true.

Also, the volume of gas flow should be maintained as slow as possible to allow for the greatest penetration of the vapor into the fiber of the material, and to avoid the pulling of fiber fluff out of the tube, which is called dusting.

From the foregoing, it will be recognized that the various objects of my invention have been achieved by the provision of improved methods and apparatus for oxidizing cellulose or other vegetable fibers or fabric out of plastic scrap and particularly rubber scrap. The temperature utilized in the reclaiming process is sufficiently low so that the scrap itself is not oxidized or burnt. The treating processes can be maintained uniform over long treating periods, and can be utilized to satisfactorily reclaim scrap in production quantities. Thus, my improved process is characterized by high efficiency and relatively low cost, as is the treating apparatus of my invention.

Throughout the description, I have referred to the fact that I preferably pass the acid vapor over scrap in a direction opposite to the direction of movement of the scrap. Although this counter flow movement has distinct advantages, it is possible to pass the acid vapor over the scrap in the same direction as the scrap is moving.

Reference has also been made to the treatment of unvulcanized rubber and like plastic. However, the principles of my invention can be used to remove fiber from vulcanized rubber and the like. Also, I can separate cotton from wool and cotton from nylon. In general, I can remove any material which is attacked and hydrolized rather easily from any material which is not readily attacked and hydrolized by the acid vapor.

While, in accord with the Patent Statutes, I have specifically illustrated and described one best known embodiment of my invention, it is to be particularly understood that I am not to be limited thereto or thereby, but that the scope of my invention is defined in the appended claims.

I claim:

1. That method of reclaiming both cellulose fiber and rubber from built up fiber and rubber material which includes the steps of comminuting the material to substantially pass a ⅜" mesh screen, treating the material having a water content of at least 1% with the vapor of hydrochloric acid having a concentration of between 21% and about 28% HCl, the concentration of the entering HCl being maintained greater than the cencentration of HCl in a constant boiling mixture and such that when the acid vapor mixes with the water present in the material the resultant acid acting on the cellulose of the material approaches that of a constant boiling mixture maintaining the entering temperature of the acid vapor between about 200° and about 240° F., bringing the temperature of the material during treatment from approximately room temperature up to a finishing temperature of between about 125° to about 175° F., agitating the material in the vapor, the total volume of the acid vapor being between about 8 to about 20 times the volume of the material, continuing the treatment between about 2 and about 7 minutes, removing the material, further reducing the material in particle size, and separating the fiber from the rubber material.

2. That method of removing cellulose fiber from structural combinations with non-cellulosic plastic material which includes the steps of breaking up the material to relatively small particle size, treating the material having a water content of at least 1% with the vapor of hydrochloric acid having a concentration of between about 21% and about 28% HCl, the concentration of the entering HCl being maintained greater than the concentration of HCl in a constant boiling mixture and such that when the acid vapor mixes with the water present in the material the resultant acid acting on the cellulose of the material approaches that of a constant boiling mixture maintaining the temperature of the acid vapor at the start of the treatment between about 200 and about 240° F., this temperature gradually being dropped until at the end of the treatment the temperature is between about 150° and about 180° F., bringing the temperature of the material during treatment from room temperature up to a finishing temperature of between about 125° to about 175° F., agitating the material in the vapor during treatment, the total volume of the acid vapor during treatment being between about 8 to about 20 times the volume of the material treated, continuing the treatment between about 2 and about 7 minutes, removing the material, and separating the fiber from the material.

3. That method of reclaiming both cellulose fiber and rubber from built up fiber and rubber material which includes the steps of comminuting the material to substantially pass a ⅜" mesh screen, treating the material having a water content of at least 1% with the vapor of hydrochloric acid having a concentration of between 21% and about 28% HCl, the concentration of the entering HCl being maintained greater than the concentration of HCl in a constant boiling mixture and such that when the acid vapor mixes with the water present in the material the resultant acid acting on the cellulose of the material approaches that of a constant boiling mixture maintaining the entering temperature of the acid vapor between about 200° and 240° F., bringing the temperature of the material during treatment from approximately room temperature up to a finishing temperature of between about 125° to about 175° F., agitating the material in the vapor, the total volume of the acid vapor being between about 8 to about 20 times the volume of the material, and separating the fiber from the rubber material.

4. That method of removing cellulose fiber from structural combinations with non-cellulosic plastic material which includes the steps of breaking up the material to relatively small particle size, treating the material having a water content of at least 1% with the vapor of hydrochloric acid having a concentration of between about 21% and about 28% HCl, the concentration of the entering HCl being maintained greater than the concentration of HCl in a constant boiling mixture and such that when the acid vapor mixes with the water present in the material the resultant acid acting on the cellulose of the material approaches that of a constant boiling mixture maintaining the temperature of the acid vapor at the start of the treatment between about 200° and about 240° F., this temperature gradually being dropped until at the end of the treatment the temperature is between about 150° and about 180° F., bringing the temperature of the material during treatment from room temperature up to a finishing temperature of between about 125° to about 175° F., agitating the material in the vapor during treatment, removing the material from the vapor, and physically separating the fiber from the material.

5. That method of reclaiming cellulose fiber and plastic from scrap combinations thereof which includes the steps of comminuting the scrap, treating the scrap with hydrochloric acid vapor made by boiling an aqueous solution of HCl having an HCl concentration greater than that of a constant boiling mixture and such that when the acid vapor mixes with the water present in the scrap, the HCl concentration present in the condensed vapor on the scrap is substantially that of a constant boiling mixture, maintaining the temperature of the scrap during treatment below the temperature of the acid vapor, and continuing the treatment for a length of time to effect substantially a maximum of depolymerization of the fiber while preventing actual hydrolysis of the cellulose molecules of the fiber to sugar.

6. That method of recovering the fabric and rubber from fabric reinforced rubber scrap, which includes the steps of passing the broken-up scrap along an elongated path while agitating the scrap, passing a mineral acid vapor in the opposite direction over the scrap during its travel along the path, maintaining the vapor at a temperature higher than the temperature of the scrap during the passage of the scrap along the path, and applying heat around the path of travel of the vapor and scrap, the heat at the end of the path where the vapor first engages the scrap being relatively high to create a drying zone, the heat then gradually dropping off as the vapor moves along the path to create a fabric reacting zone and an absorption zone, the heat then building back up during the last portion of the travel of the vapor over the scrap to substantially the temperature of the drying zone to create a re-evaporization zone.

7. That method of removing cellulose from scrap material which includes the steps of treating the scrap with hydrochloric acid vapor made by boiling an aqueous solution of HCl having an HCl concentration greater than that of a constant boiling mixture and such that when the acid vapor mixes with the water present in the scrap, the HCl concentration in the vapor condensed on the scrap is substantially that of a constant boiling mixture, and continuing the treatment of the scrap as described until substantial hydrolysis of the cellulose occurs.

References Cited in the file of this patent

UNITED STATES PATENTS

| | | | |
|---|---|---|---|
| 1,680,915 | Rose | Aug. 14, | 1928 |
| 2,304,548 | Dasher | Dec. 8, | 1942 |
| 2,313,146 | Hirschberger | Mar. 9, | 1943 |
| 2,331,836 | Hirschberger | Oct. 12, | 1943 |
| 2,487,666 | Navone | Nov. 8, | 1949 |
| 2,498,398 | Dasher | Feb. 21, | 1950 |
| 2,543,315 | Farregat | Feb. 27, | 1951 |
| 2,567,802 | Carr et al. | Sept. 11, | 1951 |